No. 874,680. PATENTED DEC. 24, 1907.
W. S. HULL.
MOSQUITO TRAP.
APPLICATION FILED SEPT. 30, 1907.

WITNESSES
INVENTOR
W<sup>m</sup> S. Hull.
BY
Attorney

UNITED STATES PATENT OFFICE.

WILLIAM S. HULL, OF JACKSON, MISSISSIPPI.

MOSQUITO-TRAP.

No. 874,680.  Specification of Letters Patent.  Patented Dec. 24, 1907.

Application filed September 30, 1907. Serial No. 395,264.

*To all whom it may concern:*

Be it known that I, WILLIAM S. HULL, citizen of the United States, residing at Jackson, county of Hinds, and State of Mississippi, have invented certain new and useful Improvements in Mosquito-Traps, of which the following is a specification, reference being had therein to the accompanying drawing.

This invention relates to a mosquito trap, and particularly to a casing within which the insects may be collected and destroyed.

The invention has for an object to provide a casing having its interior walls and suspended fabric curtains therein of a dark color to attract the insects into the apartment, and provided with means by which the fabric may be agitated when it is desired.

A further object of the invention is to provide a removable case having a door in its bottom adapted to fit the upper part of the collecting casing so that the insects driven therefrom ascend to the upper chamber and may be destroyed therein.

Other and further objects and advantages of the invention will be hereinafter fully set forth and the novel features thereof defined by the appended claims.

Figure 1:
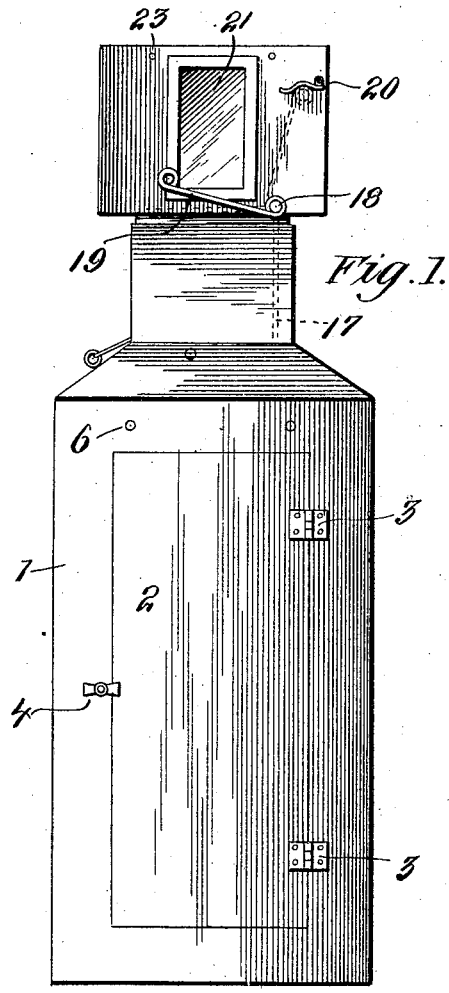
Figure 2:
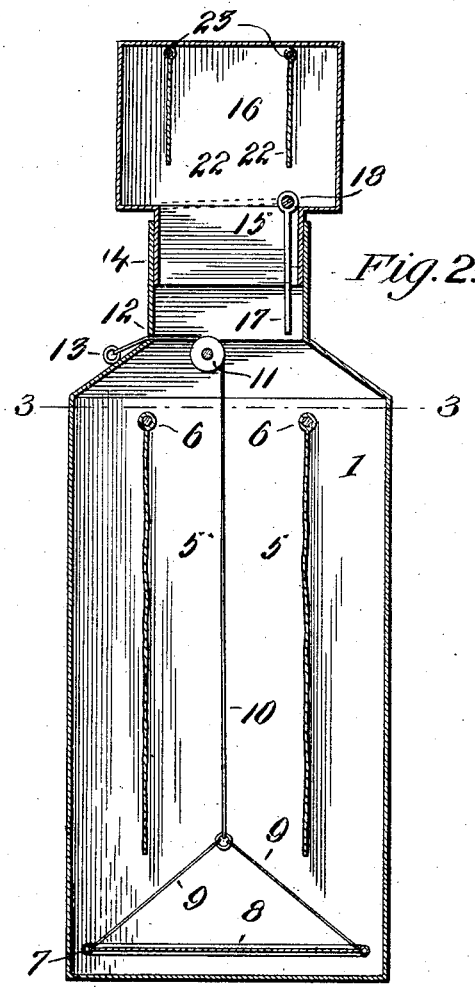
Figure 3:
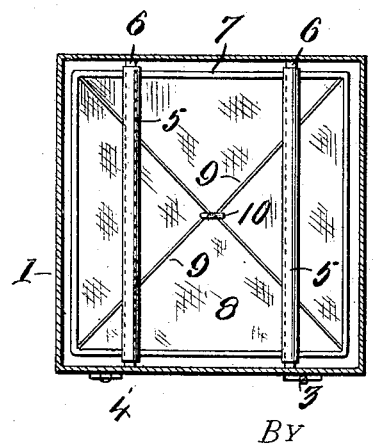

In the drawing:—Figure 1 is an elevation of the invention; Fig. 2 is a central vertical section therethrough, and Fig. 3 is a section on line 3—3, Fig. 2.

Like numerals refer to like parts in the several figures of the drawing.

Referring to the drawing, the numeral 1 designates a casing of any desired size or configuration which is provided with the door or closure 2 pivotally connected thereto at 3 and provided with a retaining latch or turn button 4. The interior of this casing or cabinet is painted or otherwise provided with a lining of dark color, preferably black, while within the case fabric curtains or sheets 5 are suspended. These may be of any desired material, but of dark color, for instance, black, and are here shown as suspended from cross rods 6 at the upper portion of the casing 1. For the purpose of agitating these curtains to cause the insects to leave the same a frame 7 is disposed within the casing in substantially horizontal position. This frame is covered with cloth as indicated at 8 and suspended by the arms 9 from the connecting cord 10 which extends upward over the pulley 11 through a suitable opening 12 in the casing so that the free end 13 thereof may be drawn outward when it is desired to raise this frame into contact with the curtain suspended above the same and by that means causing the adhering insects to leave these curtains. The upper portion of the cabinet is provided with a collar 14 adapted to receive the projected bottom walls 15 of the removable casing or chamber 16. The members 14 and 15 telescope within each other and a bottom 17 is provided for the casing 16 and pivotally mounted at 18 so as to swing upward, as shown by dotted lines in Figs. 1 and 2, thus closing this casing. The pivot 18 is provided with an operating handle 19 extended therefrom and adapted to engage the retaining spring 20 when the bottom is closed. The casing 16 is provided with a glazed sight opening 21 in order that the contents thereof may be inspected, and also with the fabric curtains 22 suspended from the rods 23 and similar in construction and operation to those described in the main casing.

It has been found that the mosquito is not attracted to a trap by bait, but in the daylight seeks rest in dark places, and the casing is therefore made interiorly of dark or black material with similarly colored curtains which provide roosting or resting surfaces for the insects. In the use of the trap the door is left open and the insects naturally seek the dark interior of the casing and may also be driven toward the casing by fans or otherwise and the door thereof then closed. The bottom of the removable top casing is then opened downwardly as shown by full lines in Fig. 2 and the frame drawn upward which by its contact with the curtains agitates them and causes the insects resting thereon to ascend from the lower casing into the upper casing as they are driven by the movement of the frame after being disturbed upon the surface of the curtains. The door in the bottom of the removable casing is then closed and the casing conveyed to any desired place for destroying the insects by steam, chemical fumes or in any desired manner. The invention therefore presents a simple, very efficient and conveniently operated trap by which mosquitos and other insects in a room may be collected and removed therefrom for destruction.

Having described my invention and set forth its merits, what I claim and desire to secure by Letters Patent is:

1. A mosquito trap comprising a casing having a closure and its interior surface of a dark color, collecting curtains within said casing, and means for agitating said curtains.

2. A mosquito trap comprising a casing having a closure and its interior surface of a dark color, and parallel hanging curtains within said casing at opposite sides of said closure.

3. A mosquito trap comprising a casing having a closure and its interior surface of dark color, curtains within said casing and of a dark color, and a removable casing provided with collecting curtains and adapted to communicate with the upper portion of the main casing.

4. A mosquito trap comprising a casing having a closure and its interior surface of dark color, curtains within said casing and of a dark color, a removable casing adapted to communicate with the upper portion of the main casing, and means within the main casing for agitating said curtains.

5. In a mosquito trap, a collecting casing, a removable casing having an extension inserted therein, a pivoted bottom disposed in said extension, an operating handle for said bottom disposed at the outer face of the removable casing, and means in the collecting casing for driving insects into the removable casing.

6. In a mosquito trap, a collecting casing, a removable casing connected thereto and provided with a closure in its bottom, hanging curtains in the collecting casing, and means for agitating said curtains.

7. In a mosquito trap, a collecting casing, a removable casing connected thereto and provided with a closure in its bottom, hanging curtains in the collecting casing, a horizontally disposed frame beneath said curtains, and an operating cord extending from said frame to the exterior of said casing at the top thereof.

8. In a mosquito trap, a collecting casing, curtains disposed therein, means for agitating said curtains, a collar at the upper portion of said casing, a removable casing having an extension to fit said collar, and a pivoted door for said extension.

9. In a mosquito trap, a collecting casing, curtains disposed therein, means for agitating said curtains, a collar at the upper portion of said casing, a removable casing having an extension to fit said collar, a pivoted door for said extension, collecting curtains within said removable casing, and a glazed aperture therein.

10. In a mosquito trap, a casing having its interior of dark color, parallel curtains of dark color suspended within said casing, a fabric covered frame disposed beneath said curtains and at an angle thereto, means for raising said frame into contact with said curtains, a removable casing having an opening communicating with the upper portion of the main casing, and means for closing said opening for the removal of said casing.

In testimony whereof I affix my signature in presence of two witnesses.

WILLIAM S. HULL.

Witnesses:
A. D. PAINE,
C. A. THOMSON.